United States Patent
Chan et al.

(10) Patent No.: US 9,723,358 B1
(45) Date of Patent: Aug. 1, 2017

(54) USB DOCKING STATION AND CONTROL METHOD THEREOF

(71) Applicant: GOOD WAY TECHNOLOGY CO., LTD., New Taipei (TW)

(72) Inventors: Wen-Hsien Chan, New Taipei (TW); Chih-Ming Tsao, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/278,742

(22) Filed: Sep. 28, 2016

(51) Int. Cl.
    H04N 21/4363    (2011.01)
    H04N 21/434     (2011.01)
    H04N 21/4402    (2011.01)
    G06F 13/40      (2006.01)
    G06F 13/42      (2006.01)

(52) U.S. Cl.
    CPC ... H04N 21/43632 (2013.01); G06F 13/4081 (2013.01); G06F 13/4282 (2013.01); H04N 21/4347 (2013.01); H04N 21/44029 (2013.01)

(58) Field of Classification Search
    CPC ......... H04N 21/43632; H04N 21/4347; H04N 21/44029; G06F 13/4081; G06F 13/4282
    See application file for complete search history.

(56) References Cited

U.S. PATENT DOCUMENTS

| | | | |
|---|---|---|---|
| 2005/0275641 A1* | 12/2005 | Franz | G09G 5/006 345/204 |
| 2005/0283563 A1* | 12/2005 | Lou | G06F 3/02 710/316 |
| 2015/0356045 A1* | 12/2015 | Soffer | G06F 13/4221 710/303 |
| 2017/0102736 A1* | 4/2017 | Peng | G06F 1/1632 |

* cited by examiner

*Primary Examiner* — Michael Teitelbaum
(74) *Attorney, Agent, or Firm* — Li & Cai Intellectual Property (USA) Office

(57) ABSTRACT

Disclosed is a USB docking station and a control method thereof. The USB docking station comprises a micro controller, a first signal multiplexer and a second signal multiplexer, a video signal processor, and a video signal converter. The first signal multiplexer chooses and outputs a first video signal from a first data signal output from a first electronic device. The second signal multiplexer chooses and outputs a second video signal from a second data signal output from a second electronic device. According to a first control signal from the first electronic device or a second control signal from the second electronic device, the micro controller controls the video signal processor to process the first video signal or the second video signal. The video signal converter converts the processed first video signal or the processed second video signal to a video output signal for displaying.

16 Claims, 5 Drawing Sheets

USB DOCKING STATION AND CONTROL METHOD THEREOF

BACKGROUND OF THE INVENTION

1. Field of the Invention

The instant disclosure relates to a USB docking station and a control method thereof; in particular, to a USB docking station and a control method thereof, which can automatically control an external display device to display the screen image of a first electronic device or the screen image of a second electronic device.

2. Description of Related Art

The USB interface has gradually become the top priority among standard interfaces, and currently the USB interface is required in many portable devices. The transfer protocol of the USB interface has developed from USB 1.0, USB 1.1, to USB 2.0 and USB 3.0, and even to USB 3.1. The USB interface was originally considered an interface through which the computer and its peripheral device are connected, so the USB Implementers' Forum (USB-IF) uses a master/slave architecture as the architecture of the USB interface. Under the master/slave architecture, the computer acts as a host device for all complex computation, and a USB device acts as a slave device. In this manner, it will be easier to design a peripheral device having the USB interface. Because of the features of "hot plugging" and "plug-and-play", the USB interface is convenient to use, so that the USB interface has been widely used in slave devices.

Moreover, to fit the designing trend relevant to the size of devices, a new type of the USB plug "USB Type-C" has been developed and it has become the new standard. However, the size of the "USB Type-C" plug is 8.3 mm*2.5 mm, which is smaller than the size of the "USB Type-A" plug, but larger than the size of the "USB Type-B" plug (e.g., the Micro-USB plug which is 6.85 mm*1.8 mm). Therefore, it will be necessary to have a new design for an adapter of the USB T e-C plug.

SUMMARY OF THE INVENTION

The instant disclosure provides an USB docking station having a first USB interface, a second USB interface and at least one video signal output terminal. The USB docking station comprises a micro controller, a first signal multiplexer, a second signal multiplexer, a video signal processor and a video signal converter. The micro controller is connected to a first electronic device and a second electronic device respectively through a first USB interface and a second USB interface, to receive a first control signal of the first electronic device or a second control signal of the second electronic device. The first signal multiplexer is connected to the micro controller. Also, the first signal multiplexer is connected to the first electronic device through the first USB interface to receive a first data signal from the first electronic device. The first signal multiplexer extracts a first video signal from the first data signal and outputs the first video signal. The second signal multiplexer is connected to the micro controller. Also, the second signal multiplexer is connected to the second electronic device through the second USB interface to receive a second data signal from the second electronic device. The second signal multiplexer extracts a second video signal from the second data signal and outputs the second video signal. The video signal processor is connected to the micro controller, the first signal multiplexer and the second signal multiplexer. The video signal processor processes the first video signal or the second video signal according to the first control signal or the second control signal. The video signal converter is connected to the video signal processor. The video signal converter converts the processed first video signal or the processed second video signal to a video output signal, and outputs the video output signal to the video signal output terminal for displaying. Moreover, the micro controller controls the video signal processor to process the first video signal or the second video signal respectively according to the first control signal and the second control signal.

The instant disclosure further provides a control method applied to an USB docking station. The USB docking station, having a first USB interface, a second USB interface and at least one video signal output terminal, comprises a micro controller, a first signal multiplexer, a second signal multiplexer, a video signal processor and a video signal converter. The first signal multiplexer and the second signal multiplexer are connected to the micro controller. The video signal processor is connected to the micro controller, the first signal multiplexer and the second signal multiplexer. The video signal converter is connected to the video signal processor. The control method comprises: receiving a first data signal from the first electronic device and a second data signal from the second electronic device, extracting a first video signal from the first data signal and a second video signal from the second data signal, and outputting the first video signal and the second video signal; processing the first video signal or the second video signal according to the first control signal or the second control signal; and converting the processed first video signal or the processed second video signal to a video output signal, and outputting the video output signal to the video signal output terminal for displaying.

In the USB docking station and the control method thereof provided in one embodiment of the instant disclosure, the type of the first USB interface and the second USB interface is the USB Type-C, and the transfer protocol of the first USB interface and the second USB interface is the USB 3.1.

To sum up, by using the USB docking station and the control method thereof provided by the instant disclosure, the video output signal outputted from the video signal output terminal can be controlled. In other words, the image displayed on a display device, which is connected to the video signal output terminal, can be controlled or automatically switched to be the screen image of the first electronic device or the second electronic device. In addition, data can be transmitted between the first electronic device and the second electronic device for copying data or accessing data. The micro controller is considered a medium for the data transmission between the first electronic device and the second electronic device, so even though the first electronic device and the second electronic device are both host devices, data can be transmitted by only using USB transfer lines and this USB docking station, making it convenient.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only used to distinguish one element from another. For example, a first element could be termed a second element, and, similarly, a second element could be termed a first element, without departing from the teachings of the instant disclosure. As used herein, the term "and/or" includes any and all combinations of one or more of the associated listed items.

One Embodiment of the USB Docking Station

Figure 1:
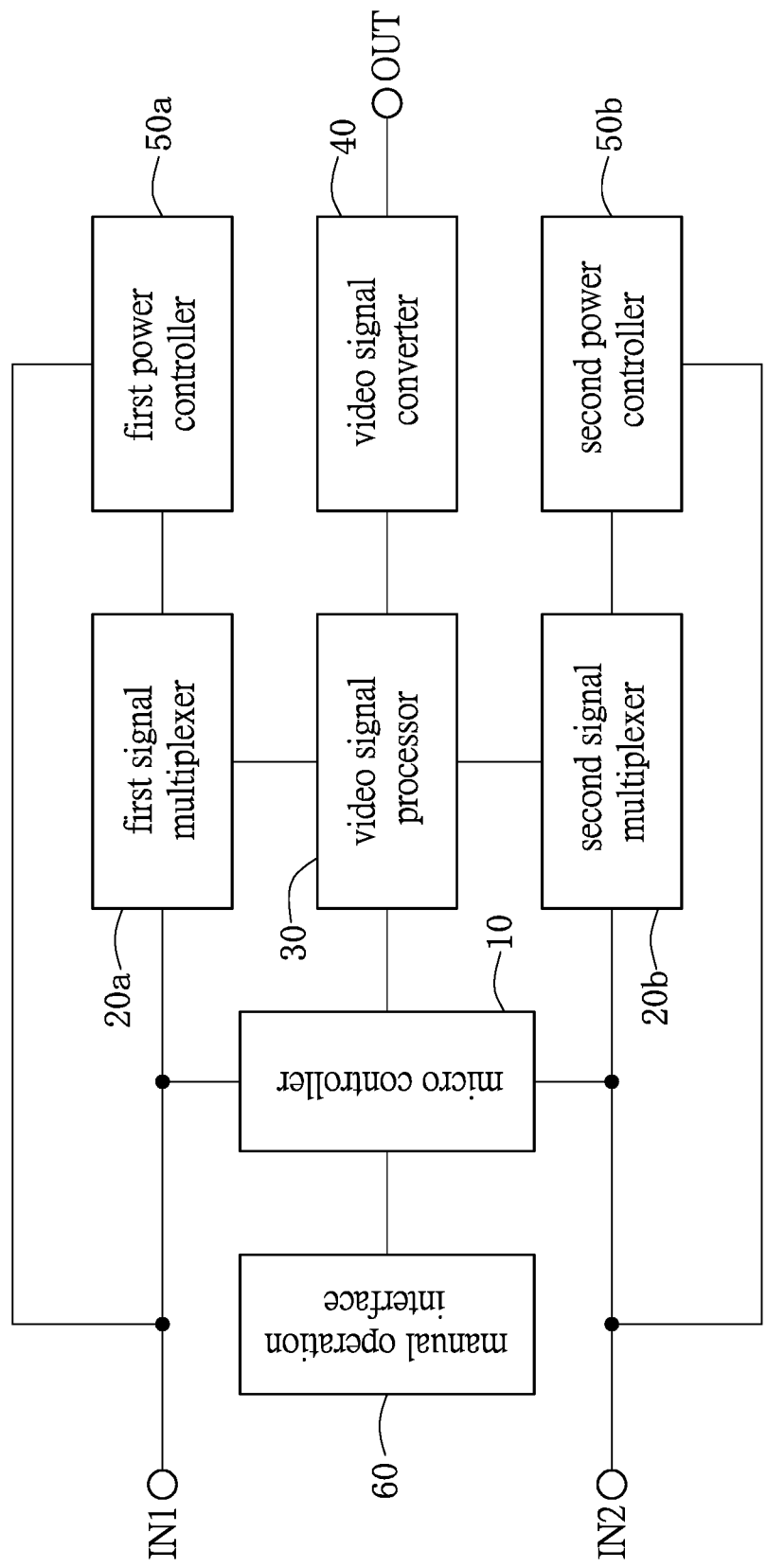
FIG. 1 shows a block diagram of an USB docking station of one embodiment of the instant disclosure.

The USB docking station provided in this embodiment can automatically and immediately switch the video output signal outputted from its video signal output terminal. Referring to FIG. 1, FIG. 1 shows a block diagram of a USB docking station of one embodiment of the instant disclosure.

As shown in FIG. 1, the USB docking station 1 provided in this embodiment has a first USB interface IN1, a second USB interface IN2 and at least one video signal output terminal OUT. In addition, the USB docking station 1 comprises a micro controller 10, a first signal multiplexer 20a, a second signal multiplexer 20b, a video signal processor 30 and a video signal converter 40. The micro controller 10 is connected to the first electronic device (not shown) through the first USB interface IN1, and is connected to the second electronic device (not shown) through the second USB interface IN2. The first signal multiplexer 20a and the second signal multiplexer 20b are both connected to the micro controller 10. The video signal processor 30 is connected to the micro controller 10, the first signal multiplexer 20a and the second signal multiplexer 20b. The video signal converter 40 is connected to the video signal processor 30.

The first electronic device and the second electronic device can be host devices, such as personal computers, laptops or the like, and also can be slave devices, such as mobile phones, tablets or the like. Using the USB docking station 1, the image displayed on an external display device can be automatically and immediately switched to be the screen image of the first electronic device or the screen image of the second electronic device. It is worth mentioning that, preferably, the type of the first USB interface IN1 and the second USB interface IN2 is USB Type-C, and the transfer protocol of the first USB interface IN1 and the second USB interface IN2 is USB 3.1. However, it is not limited herein.

For example, when a user is working by using both his personal computer, which is taken as an example of the first electronic device, and his tablet, which is taken as an example of the second electronic device, he can make his personal computer and tablet connect to the USB docking station 1 respectively through the first USB interface IN1 and the second USB interface IN2, and make an external display device connected to the video signal output terminal OUT of the USB docking station 1. In this manner, the image displayed on the external display device can be switched to be the screen image of the personal computer or the screen image of the tablet.

More specifically, in the above example, because the personal computer and the tablet are connected to the USB docking station 1 respectively through the first USB interface IN1 and the second USB interface IN2, the first signal multiplexer 20a can receive a first data signal from the personal computer, then can extract a first video signal from the first data signal, and output the first video signal. At the same time, the second signal multiplexer 20b can receive a second data signal from the tablet, then can extract a second video signal from the second data signal, and output the second video signal.

After that, the micro controller 10 receives a first control signal from the personal computer and a second control signal from the tablet, and then controls the video signal processor 30 to process the first video signal according to the first control signal or controls the video signal processor 30 to process the second video signal according to the second control signal. Moreover, in this embodiment, a software program (APP) is installed in both of the personal computer and the tablet. For the personal computer, which is a host device, this software program can be a resident program that is executed as soon as the host device is started up. On the other hand, for the tablet, which is a slave device, this software program can be a mobile application that can be run under the operating system of the tablet. The personal computer can transmit the first control signal and the tablet can transmit the second control signal to the micro controller 10 by operating this software program. As a result, the micro controller 10 controls the video signal processor 30 to process the first video signal transmitted from the personal computer according to the first control signal or to process the second video signal transmitted from the tablet according to the second control signal.

In this embodiment, a user can operate the resident program installed in the personal computer to transmit the first control signal to the micro controller 10, or he also can operate the mobile application installed in the tablet to transmit the second control signal to the micro controller 10. After that, the micro controller 10 controls the video signal processor 30 to process the first video signal according to the first control signal or to process the second video signal according to the second control signal. Finally, the video signal converter 40 receives and converts the processed first video signal or the processed second video signal to a video output signal, and outputs the video output signal to the video signal output terminal OUT for displaying. The video signal converter 40 can be, for example, a DP-HDMI signal converter, but it is not limited herein.

At the timing when the micro controller 10 receives the first control signal, the micro controller 10 controls the video signal processor 30 to process the first video signal. After that, the video signal converter 40 converts the processed first video signal to the video output signal, and outputs the video output signal to the video signal output terminal OUT, such that the screen image of the personal computer can be displayed on the external display device. At the next timing when the micro controller 10 receives the second control signal, the micro controller 10 controls the video signal processor 30 to process the second video signal. After that, the video signal converter 40 converts the processed second video signal to the video output signal, and outputs the video output signal to the video signal output terminal OUT, such that the image displayed on the external display device is immediately switched to be the screen image of the tablet.

Additionally, the condition to output a first control signal can be set by using the resident program installed in the personal computer, so that the first control signal is automatically outputted to the micro controller 10 by the resident program as soon as a user uses a mouse to make the cursor move or as soon as a user types by using a keyboard. On the other hand, the condition to output a second control signal can be set by using the mobile application installed in the tablet, so that the second control signal is automatically outputted to the micro controller 10 by the mobile application as soon as a user touches a touch screen of the tablet or pushes a button of the tablet. In this manner, no matter whether the user is using his computer or tablet, the external display device can automatically and immediately display the screen image of the device the user is using, and the user does not need to switch the image displayed on the external display device by himself. It should be noted that, in this embodiment, the micro controller 10 can be, for example, a single-chip micro controller having a firmware. In addition, this firmware corresponds to the software program installed in the first electronic device and the second electronic device. Specifically speaking, the micro controller 10 executes the firmware to process the received event, and further transmits a write command or a read command to the first electronic device and the second electronic device, or further controls the first electronic device and the second electronic device to link to a remote disk or a remote folder shared by the first electronic device and the second electronic device.

Also shown in FIG. 1, the USB docking station 1 can further comprise a manual operation interface 60, such as a button or an operation interface. The manual operation interface 60 is connected to the micro controller 10, and a third control signal is transmitted to the micro controller 10 as soon as a user operates the manual operation interface 60. After that, the micro controller 10 controls the video signal processor 30 to process the first video signal or the second video signal according to the third control signal. In other words, by operating the manual operation interface 60, the screen image of the personal computer or the tablet can be set to be always displayed on the external display device.

Moreover, in this embodiment, the USB docking station 1 can further comprise a first power controller 50a and a second power controller 50b. Again referring to FIG. 1, the first power controller 50a is connected between the first signal multiplexer 20a and the first USB interface IN1, and the second power controller 50b is connected between the second signal multiplexer 20b and the second USB interface IN2. In the above example, in addition to the first video signal and the second video signal, the first signal multiplexer 20a also extracts a first power signal from the first data signal and outputs the first power signal, and the second signal multiplexer 20b also extracts a second power signal from the second data signal and outputs the second power signal. After that, the first power controller 50a and the second power controller 50b respectively control the power provided to the first USB interface IN1 according to the first power signal and the power provided to the second USB interface IN2 according to the second power signal.

More specifically, in this embodiment, the first power controller 50a and the second power controller 50b are both connected to a DC-DC power converter (not shown) to receive a DC power supply. In addition, the first power controller 50a and the second power controller 50b can be, for example, power control chips; however, details about how the power control chips control the power provided to the first USB interface IN1 and the second USB interface IN2 are easily understood by those skilled in the art, and thus the information is not repeated here.

It is worth mentioning that, when a user is working using several electronic devices, in addition to automatically switching the image displayed on the external display device, the user can also use the USB docking station to transmit data between his electronic devices for reading data, writing data or copying data.

As described, the USB docking station 1 is connected to the first electronic device through a USB transmission line and the first USB interface IN1, and is connected to the second electronic device through another USB transmission line and the second USB interface IN2. When both of the first electronic device and the second electronic device are slave devices, or only one of the first electronic device and the second electronic device is a host device, the first electronic device (or the second electronic device) can transmit an event to the micro controller 10 by operating the software program. According to the event, the micro controller 10 transmits a command, such as a write command or a read command, to the second electronic device (or the first electronic device) for transmitting data.

Likewise, if both of the first electronic device and the second electronic device are host devices (e.g., the first electronic device and the second electronic device are personal computers), when the user needs to transmit data between devices for accessing data or copying data, the first electronic device (or the second electronic device) can transmit an event to the micro controller 10 by operating the software program. Different from the case that the devices are both slave devices or the case that one of devices is a slave device, the micro controller 10, according to the event, controls the first electronic device or the second electronic device to link to a remote disk or a remote folder shared by the first electronic device and the second electronic device. In this manner, data can be transmitted between the first electronic device and the second electronic device by using their shared remote disk or their shared remote folder. In other words, the micro controller 10 is considered a medium for the data transmission between two host devices. By using a remote disk or a remote folder shared by the first electronic device and the second electronic device, the data transmission through the USB docking station 1 is not limited to the host-slave data transmission. Even though the first electronic device and the second electronic device are both host devices, data can be transmitted by only using USB transfer lines and the USB docking station 1.

Another Embodiment of the USB Docking Station

Figure 2:
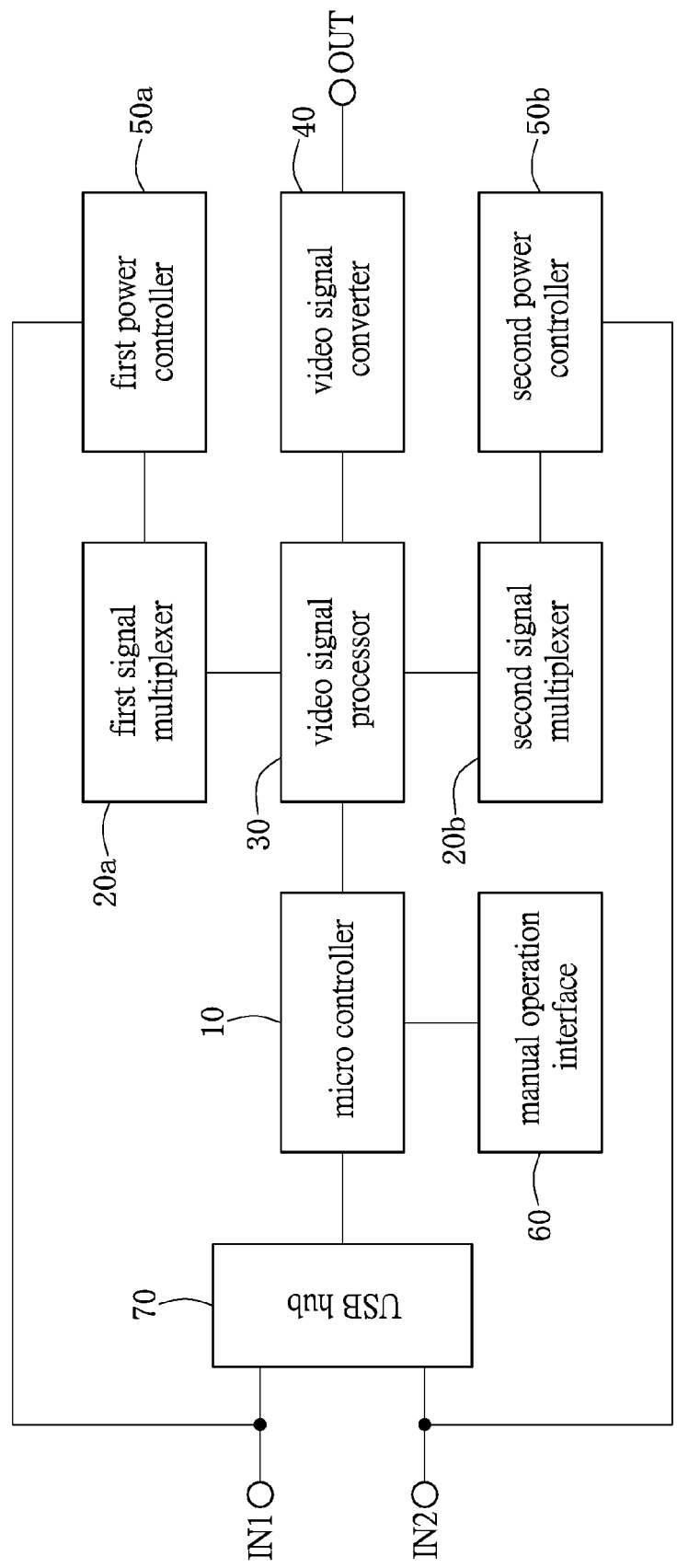
FIG. 2 shows a block diagram of an USB docking station of another embodiment of the instant disclosure.

FIG. 2 shows a block diagram of a USB docking station of another embodiment of the instant disclosure. The USB docking station 1 shown in FIG. 1 and the USB docking station 2 provided in this embodiment have similar configurations and similar working principles which have been described in the above embodiment. However, the difference between the docking station 1 shown in FIG. 1 and the USB docking station 2 provided in this embodiment is that, the USB docking station 2 further comprises a USB hub 70. As shown in FIG. 2, the USB hub 70 is connected to the first USB interface IN1, the second USB interface IN2 and the micro controller 10.

In this embodiment, when the first electronic device and the second electronic device are both slave devices, or when only one of the first electronic device and the second electronic device is a host device, for transmitting data (e.g., copying data or reading/writing data), the first electronic device (or the second electronic device) can directly transmit an event to the second electronic device (or the first electronic device) through the USB hub 70 by operating the software program. Details about how the data transmission can be implemented between two slave devices, or between a slave device and a host device through the USB hub 70 are easily understood by those skilled in the art, and thus the information is not repeated here.

On the other hand, when the first electronic device and the second electronic device are both host devices, for transmitting data (e.g., copying data or reading/writing data), the first electronic device (or the second electronic device) can transmit an event to the micro controller 10 by operating the software program. According to this event, the micro controller 10 controls the first electronic device or the second electronic device to link to a remote disk or a remote folder shared by the first electronic device and the second electronic device, such that the first electronic device and the second electronic device can mutually transmit data by using the shared remote disk or remote folder.

Likewise, in this embodiment, the micro controller 10 is also considered a medium for the data transmission between two host devices. By using a remote disk or a remote folder shared by the first electronic device and the second electronic device, the data transmission through the USB docking station 2 is not limited to the host-slave data transmission. Even though the first electronic device and the second electronic device are both host devices, data can be transmitted by only using USB transfer lines and the USB docking station 2.

It is worth mentioning that, in the embodiment shown in FIG. 1, no matter that the first electronic device and the second electronic device are both host devices, both slave devices, or a slave device and a host device, during the data transmission, the micro controller 10 of the USB docking station 1 always needs to receive an event to further transmit a command (e.g., a write command or a read command) to devices, or to further control devices to link to their shared remote disk or folder. However, in this embodiment, the micro controller 10 of the USB docking station 2 needs to receive an event to further control devices to link to their shared remote disk or folder during the data transmission only when the first electronic device and the second electronic device are both host devices. When the first electronic device and the second electronic device are both slave devices, or when only one of first electronic device and the second electronic device is a host device, data can be directly transmitted through the USB hub 70.

Thus, in practice, compared with the micro controller 10 used in the USB docking station 1 as shown in FIG. 1, the micro controller 10 used in the USB docking station 2 as shown in FIG. 2 has less and lower performance requirements to satisfy, which makes the micro controller 10 used in the USB docking station 2 cost less than the micro controller 10 used in the USB docking station 1.

Figure 3:
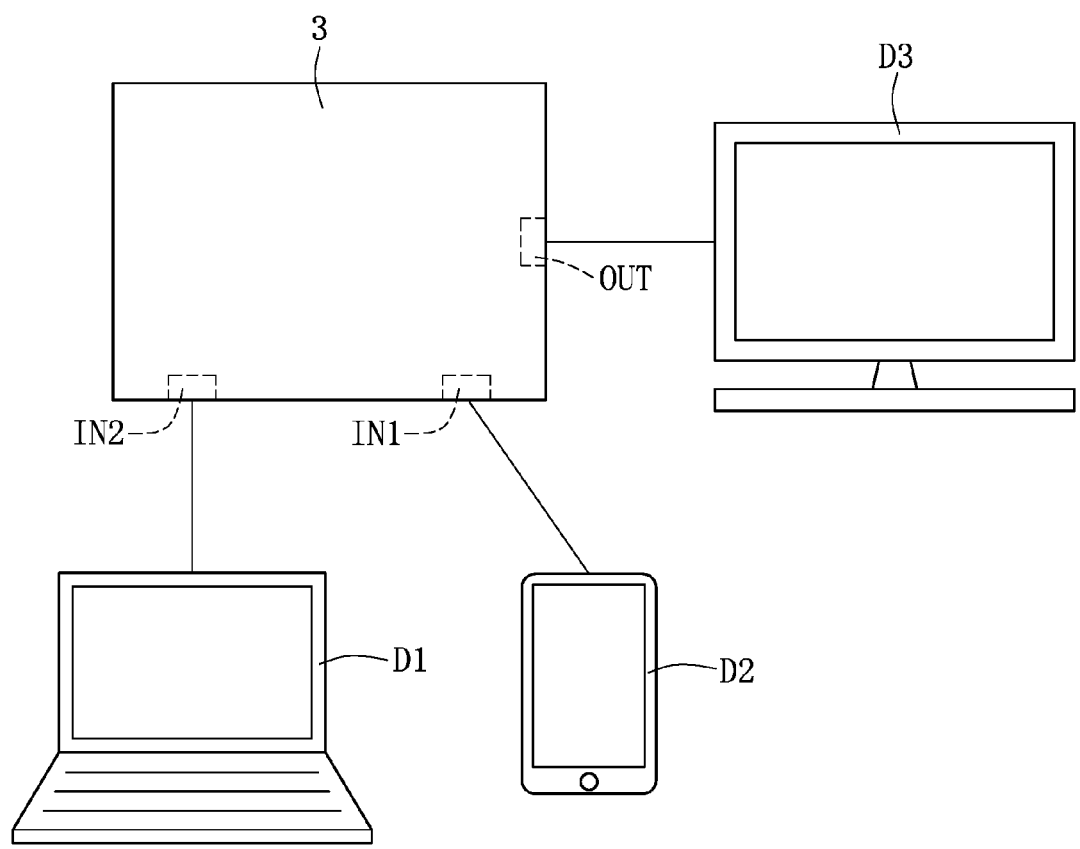
FIG. 3 shows a schematic diagram of an USB docking station of one embodiment of the instant disclosure.

FIG. 3 shows a schematic diagram of a USB docking station of one embodiment of the instant disclosure. The USB docking station 3 shown in FIG. 3 can be the USB docking station 1 provided by the embodiment shown in FIG. 1 or the USB docking station 2 provided by the embodiment shown in FIG. 2.

As shown in FIG. 3, as long as a user makes electronic devices D1 and D2 (e.g., a laptop, a tablet or the like) connect to the USB docking station 3 respectively through a first USB interface IN1 and a second USB interface IN2, the image displayed on a display device D3, which is connected to a video signal output terminal OUT of the USB docking station 3, can be controlled or automatically switched by operating a software program. Moreover, no matter that the first electronic device D1 and the second electronic device D2 are both slave devices, or that only one of the first electronic device D1 and the second electronic device D2 is a host device, by using the USB docking station 3 in this embodiment, data can be directly transmitted between the first electronic device D1 and the second electronic device D2 only through an USB hub and USB transfer lines. In other words, the data transmission through the USB docking station 3 is not limited to the host-slave data transmission.

One Embodiment of a Control Method

Figure 4A:
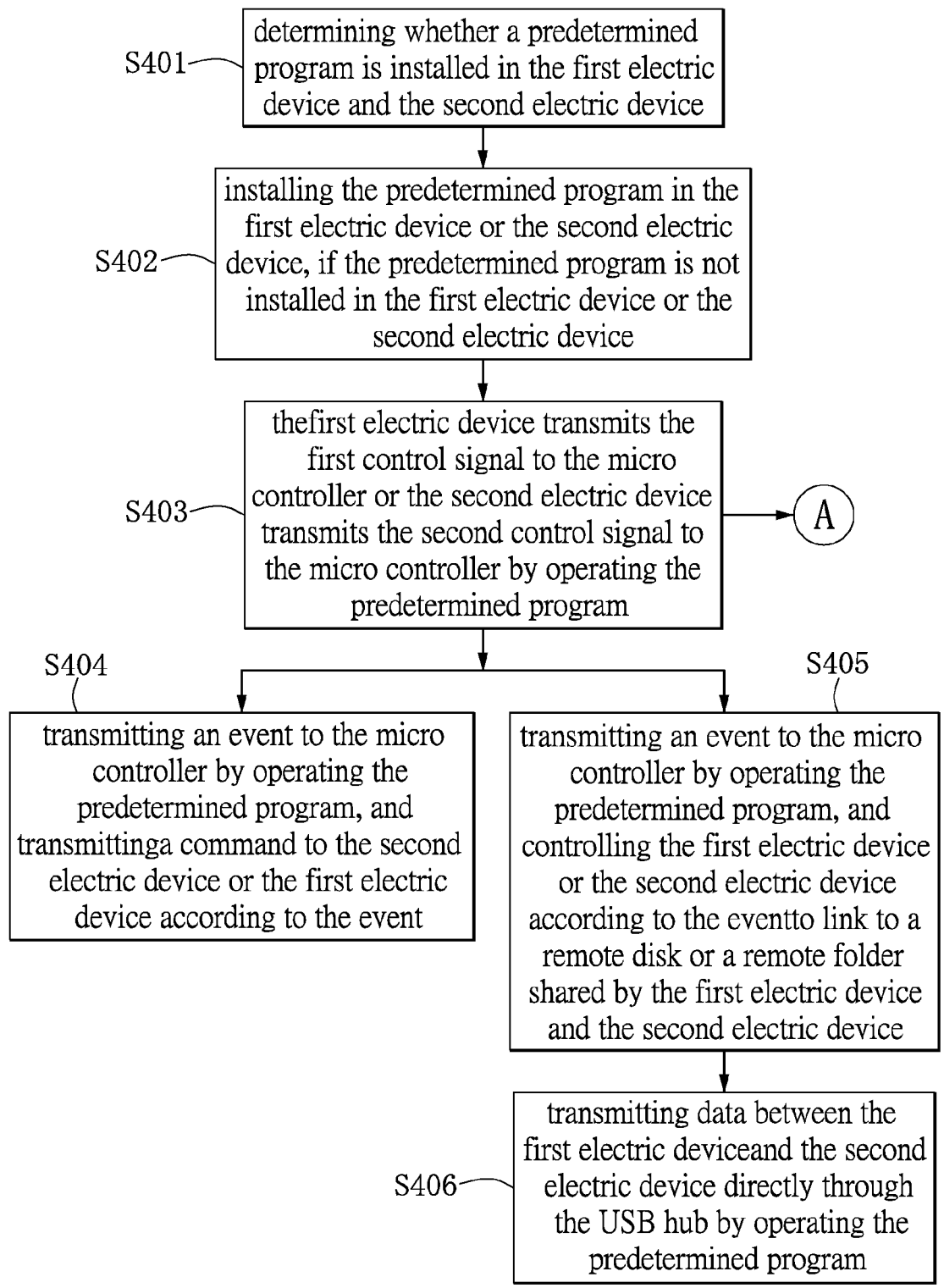
FIG. 4A and FIG. 4B show flow charts of a control method applied to an USB docking station of one embodiment of the instant disclosure.
Figure 4B:
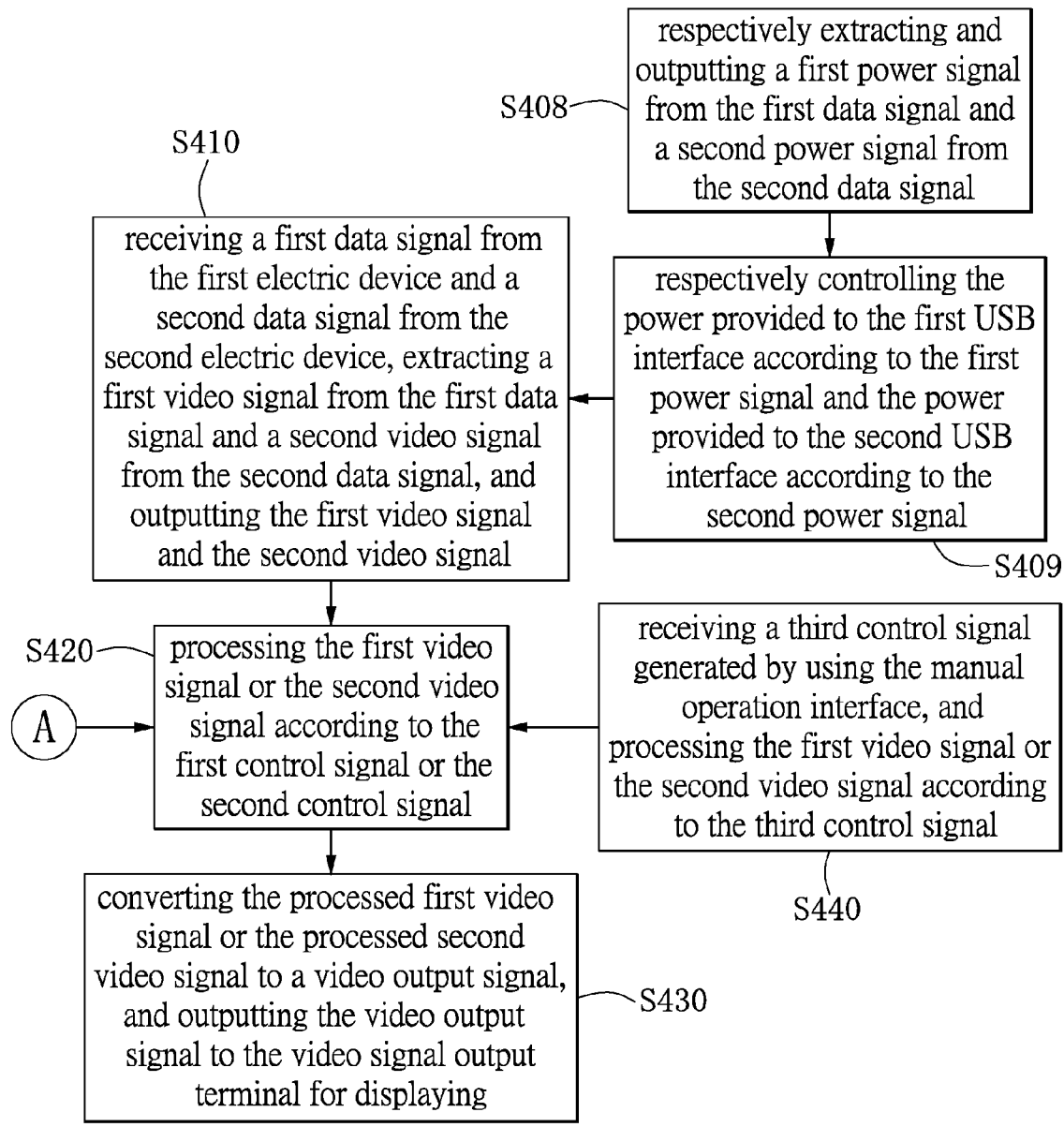

FIG. 4A and FIG. 4B show flow charts of a control method executed by an USB docking station of one embodiment of the instant disclosure. This control method can be applied to the USB docking stations 1 and 2 shown in FIG. 1 and FIG. 2.

As shown in FIG. 4A, the control method in this embodiment comprises steps as follows. Step S410 is to receive a first data signal from the first electronic device and a second data signal from the second electronic device, to extract a first video signal from the first data signal and a second video signal from the second data signal, and to output the first video signal and the second video signal. After that, step S420 is to process the first video signal or the second video signal according to the first control signal or the second control signal. Finally, step S430 is to convert the processed first video signal or the processed second video signal to a video output signal, and to output the video output signal to the video signal output terminal for displaying.

In addition, the control method in this embodiment can also comprise step S408 and step S409 to control the power provided to the USB interfaces. Specifically speaking, step S408 is to respectively extract and output a first power signal from the first data signal and a second power signal from the second data signal, and step S409 is to respectively control the power provided to the first USB interface according to the first power signal and the power provided to the second USB interface according to the second power signal.

As described in the embodiments shown in FIG. 1 and FIG. 2, the USB docking stations 1 and 2 can also comprise a manual operation interface that is connected to the micro controller for a user to switch the image displayed on an external display device by using a physical operation interface or button. Thus, the control method in this embodiment can also comprise step S440, and step S440 is to receive a third control signal generated by using the manual operation interface, and to process the first video signal or the second video signal according to the third control signal.

Again, as described in the embodiments shown in FIG. 1 and FIG. 2, an event is transmitted between electronic devices or between an electronic device and a micro controller by operating a software program. Thus, to check whether the software program is installed in the electronic devices that are connected to the USB docking station, the control method in this embodiment also comprises steps S401-S403, as shown in FIG. 4B.

More specifically, step S401 is to determine whether a software program is installed in the first electronic device and the second electronic device. After that, step S402 is to install the software program in the first electronic device or the second electronic device, if the software program is not installed in the first electronic device or the second electronic device. Finally, in step S403, the first electronic device transmits the first control signal to the micro controller or the second electronic device transmits the second control signal to the micro controller by operating the software program.

Additionally, when the control method in this embodiment is applied to the USB docking station 1 as shown in FIG. 1, if at least one of the first electronic device and the second electronic device is a slave device, the control method in this embodiment also comprises step S404 that is shown in FIG. 4B for transmitting data. Step S404 is to transmit an event to the micro controller by operating the software program, and to transmit a command (e.g., a write command or a read command) to the second electronic device or the first electronic device according to the event. Otherwise, if the first electronic device and the second electronic device are both host devices, the control method in this embodiment also comprises step S405 that is shown in FIG. 4B for transmitting data. Step S405 is to transmit an event to the micro controller by operating the software program, and to control the first electronic device or the second electronic device according to the event to link to a remote disk or a remote folder shared by the first electronic device and the second electronic device.

On the other hand, when the control method in this embodiment is applied to the USB docking station 2 as shown in FIG. 2, if at least one of the first electronic device and the second electronic device is a slave device, the control method in this embodiment also comprises step S406 that is shown in FIG. 4B for transmitting data. Step S406 is to transmit data between the first electronic device and the second electronic device directly through the USB hub by operating the software program.

To sum up, by using the USB docking station and the control method thereof provided by the instant disclosure, the video output signal outputted from the video signal output terminal can be controlled. In other words, the image displayed on a display device, which is connected to the video signal output terminal, can be controlled or automatically switched to be the screen image of the first electronic device or the second electronic device. In addition, data can be transmitted between the first electronic device and the second electronic device for copying data or accessing data. The micro controller is considered a medium for the data transmission between the first electronic device and the second electronic device, so even though the first electronic device and the second electronic device are both host devices, data can be transmitted by only using USB transfer lines and this USB docking station.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A USB docking station, having a first USB interface, a second USB interface and at least one video signal output terminal, comprising:
   a micro controller, connected to a first electronic device and a second electronic device respectively through a first USB interface and a second USB interface, and receiving a first control signal of the first electronic device or a second control signal of the second electronic device;
   a first signal multiplexer, connected to the micro controller, wherein the first signal multiplexer is also connected to the first electronic device through the first USB interface to receive a first data signal from the first electronic device, to extract a first video signal from the first data signal and to output the first video signal;
   a second signal multiplexer, connected to the micro controller, wherein the second signal multiplexer is also connected to the second electronic device through the second USB interface to receive a second data signal from the second electronic device, to extract a second video signal from the second data signal and to output the second video signal;
   a video signal processor, connected to the micro controller, the first signal multiplexer and the second signal multiplexer, and processing the first video signal or the second video signal according to the first control signal or the second control signal; and
   a video signal converter, connected to the video signal processor, converting the processed first video signal or the processed second video signal to a video output signal, and outputting the video output signal to the video signal output terminal for displaying;
   wherein the micro controller controls the video signal processor to process the first video signal or the second video signal respectively according to the first control signal and the second control signal.

2. The USB docking station according to claim 1, further comprising:
   a first power controller and a second power controller, wherein the first power controller is connected between the first signal multiplexer and the first USB interface, and the second power controller is connected between the second signal multiplexer and the second USB interface;
   wherein the first signal multiplexer and the second signal multiplexer respectively extract and output a first power signal from the first data signal and a second power signal from the second data signal, and the first power controller and the second power controller respectively control the power provided to the first USB interface according to the first power signal and the power provided to the second USB interface according to the second power signal.

3. The USB docking station according to claim 1, wherein the type of the first USB interface and the second USB interface is the USB Type-C, and the transfer protocol of the first USB interface and the second USB interface is the USB 3.1.

4. The USB docking station according to claim 1, wherein a software program is installed in both of the first electronic device and the second electronic device, and the first electronic device transmits the first control signal to the micro controller or the second electronic device transmits the second control signal to the micro controller by operating the software program.

5. The USB docking station according to claim 1, further comprising:
a manual operation interface, connected to the micro controller, wherein a third control signal is transmitted to the micro controller by using the manual operation interface, such that the micro controller controls the video signal processor according to the third control signal to process the first video signal or the second video signal.

6. The USB docking station according to claim 4, wherein when at least one of the first electronic device and the second electronic device is a slave device, the first electronic device or the second electronic device transmits an event to the micro controller by operating the software program, and the micro controller transmits a command to the second electronic device or the first electronic device according to the event for transmitting data.

7. The USB docking station according to claim 4, wherein when the first electronic device and the second electronic device are host devices, the first electronic device or the second electronic device transmits an event to the micro controller by operating the software program, and the micro controller controls the first electronic device or the second electronic device to link to a remote disk or a remote folder shared by the first electronic device and the second electronic device according to the event for transmitting data.

8. The USB docking station according to claim 7, further comprising:
an USB hub, connected to the first USB interface, the second USB interface and the micro controller, wherein when at least one of the first electronic device and the second electronic device is a slave device, the first electronic device and the second electronic device transmit data directly through the USB hub by operating the software program.

9. A control method, executed by an USB docking station, the USB docking station having a first USB interface, a second USB interface and at least one video signal output terminal, the USB docking station comprising a micro controller, a first signal multiplexer, a second signal multiplexer, a video signal processor and a video signal converter, wherein the first signal multiplexer and the second signal multiplexer are connected to the micro controller, the video signal processor is connected to the micro controller, the first signal multiplexer and the second signal multiplexer, and the video signal converter is connected to the video signal processor, the control method comprising:
receiving a first data signal from the first electronic device and a second data signal from the second electronic device, extracting a first video signal from the first data signal and a second video signal from the second data signal, and outputting the first video signal and the second video signal;
processing the first video signal or the second video signal according to the first control signal or the second control signal; and
converting the processed first video signal or the processed second video signal to a video output signal, and outputting the video output signal to the video signal output terminal for displaying.

10. The control method according to claim 9, further comprising:
respectively extracting and outputting a first power signal from the first data signal and a second power signal from the second data signal; and
respectively controlling the power provided to the first USB interface according to the first power signal and the power provided to the second USB interface according to the second power signal.

11. The control method according to claim 9, wherein the type of the first USB interface and the second USB interface is the USB Type-C, and the transfer protocol of the first USB interface and the second USB interface is the USB 3.1.

12. The control method according to claim 9, further comprising:
determining whether a software program is installed in the first electronic device and the second electronic device; and
installing the software program in the first electronic device or the second electronic device, if the software program is not installed in the first electronic device or the second electronic device;
wherein the first electronic device transmits the first control signal to the micro controller or the second electronic device transmits the second control signal to the micro controller by operating the software program.

13. The control method according to claim 9, wherein the USB docking station further comprises a manual operation interface and the manual operation interface is connected to the micro controller, the control method comprising:
receiving a third control signal generated by using the manual operation interface, and processing the first video signal or the second video signal according to the third control signal.

14. The control method according to claim 12, wherein when at least one of the first electronic device and the second electronic device is a slave device, the control method further comprising:
transmitting an event to the micro controller by operating the software program, and transmitting a command to the second electronic device or the first electronic device according to the event for transmitting data.

15. The control method according to claim 12, wherein when the first electronic device and the second electronic device are host devices, the control method further comprising:
transmitting an event to the micro controller by operating the software program, and controlling the first electronic device or the second electronic device to link to a remote disk or a remote folder shared by the first electronic device and the second electronic device according to the event for transmitting data.

16. The control method according to claim 15, wherein the USB docking station further comprises an USB hub, the USB hub is connected to the first USB interface, the second USB interface and the micro controller, and when at least one of the first electronic device and the second electronic device is a slave device, the control method further comprising:
transmitting data between the first electronic device and the second electronic device directly through the USB hub by operating the software program.

* * * * *